July 22, 1969     D. O. VANCIL ET AL     3,457,150
BENEFICIATION OF CRYOLITE MATERIAL
Filed Nov. 22, 1966
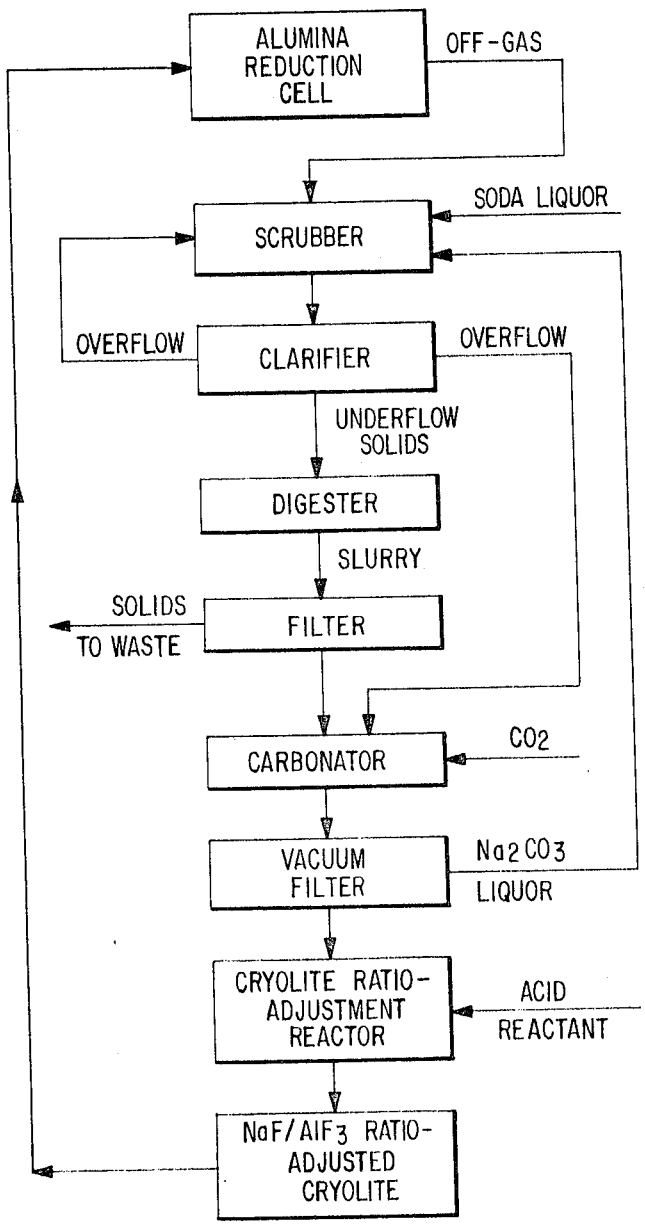
INVENTORS
DONALD O. VANCIL
MAURICE C. HARRISON
BY *Glenn, Palmer, Matthews & Lyne*
ATTORNEYS

United States Patent Office 3,457,150
Patented July 22, 1969

3,457,150
BENEFICIATION OF CRYOLITE MATERIAL
Donald Otis Vancil and Maurice Clark Harrison, Longview, Wash., assignors to Reynolds Metals Company, Richmond, Va., a corporation of Delaware
Filed Nov. 22, 1966, Ser. No. 596,236
Int. Cl. C22d 1/06; B01k 1/00; B01d 53/00
U.S. Cl. 204—67                                    8 Claims

ABSTRACT OF THE DISCLOSURE

Cryolite material recovered from such sources as the waste gases and cell linings and electrodes of alumina reduction cells is analyzed to determine the amount of fluorine needed to offset unrecovered fluorine losses, and also the amounts of sodium and aluminum required to react with the make-up fluorine, and then reacted in the presence of reactive alumina with a mineral acid and a fluorine-containing substance until the reaction mixture reaches a stabilized pH in the range of 4.8 to 6.7, and the treated cryolite material having a lower $NaF/AlF_3$ ratio may then be recycled to an alumina reduction cell.

---

This invention relates to a novel method of operating alumina reduction cells employing a fused cryolite electrolyte, including the recovery of cryolitic components separated from the electrolyte during the reduction process, and the beneficiation of aid components to form cryolite having the desired $NaF/AlF_3$ weight ratio for cell operation, and the return of this cryolite to the reduction cells.

During the operation of alumina reduction cells, the molten cryolite electrolyte gradually becomes depleted in fluoride content, by vaporization of components rich in aluminum fluoride. At the same time cryolite components rich in sodium are absorbed into the carbonaceous cathode of the reduction cell. Since it is generally considered desirable to maintain the $NaF/AlF_3$ weight ratio of the electrolyte within the range of about 1.3 to 1.5 for optimum cell operation, soda ash may be added during this period to replace the excess sodium collected in the cathode, and alkaline cryolite is advantageously used for this purpose. This phase of operation will usually occur within six to twelve months after a new cell is placed in use.

For the remaining two to three years of cell life it becomes necessary periodically to add aluminum fluoride and cryolite to match the composition of the vaporization lossess. Where the make-up cryolite contains excess sodium fluoride, or sodium oxide, hydroxide or carbonate values, even greater amounts of expensive aluminum fluoride must be added to preserve the ratio. Thus, during the greater part of the operating life of an alumina reduction cell, both cryolite and aluminum fluoride must be supplied to the cell, necessitating the maintenance of inventories of such compounds, and increasing the cost of operation.

It is also customary to recover fluorine values from cell waste gases, and from used pot linings and other materials employed in the cells. This is usually accomplished by employing a caustic aluminate leach liquor, followed by carbonation to precipitate synthetic cryolite. The resulting cryolite is alkaline and of limited usefulness.

The problem of recovering cryolite materials from cell off-gases, and other sites to which cryolite materials are lost from the cell through depletion of the electrolyte so as to provide a cryolite having a low $NaF/AlF_3$ weight ratio, and which would be of great value as an additive to alumina reduction cells in maintaining the optimum ratio of NaF to $AlF_3$ in the electrolyte, as well as for other purposes, remained unsolved prior to the present invention.

In the aluminum industry, and for purposes of this invention, the term cryolite material is employed to denote a range of materials comprising mixtures of NaF and $AlF_3$ or one or more of the double salts of NaF and $AlF_3$. The cryolite materials are usually characterized by the ratio of the total weight of NaF contained in a given quantity to the total weight of $AlF_3$ present, without regard to the presence or absence of chemical bonding between the NaF and $AlF_3$. The value of this weight ratio for naturally occurring cryolite is about 1.5, in good agreement with the weight ratio of the molecular double salt $3NaF \cdot AlF_3$. X-ray and other evidence indicates the existence of two other double salts, $5NaF \cdot 3AlF_3$ (weight ratio 0.833), and $NaF \cdot AlF_3$ (weight ratio 0.5).

It is also common in the aluminum industry to characterize cryolite materials by their "percent excess $AlF_3$" or "percent excess NaF," which terms are defined as the percent $AlF_3$ (or NaF) present in the material in excess of the amount required to form, with the NaF (or $AlF_3$) present, a cryolite of weight ratio 1.5. Thus, the double salts $5NaF \cdot 3AlF_3$ and $NaF \cdot AlF_3$ would be described as having about 24.1 and 44.5 percent excess $AlF_3$, respectively.

Cryolite material amenable to the treatment of the invention may be derived from any suitable source involved in the operation of alumina reduction cells, as by direct recovery from reduction cell waste gases, or from cell linings and electrodes.

In accordance with the invention such cryolite material, after determination of its $NaF/AlF_3$ weight ratio, and the determination of the amount of fluorine needed to offset unrecovered fluorine losses during cell operation, and of the amounts of sodium and aluminum required for reaction with such make-up fluorine and fluorine values in the recovered cryolitic material, is reacted in the presence of reactive alumina and of any additional sodium compound required, with an acid selected from the group consisting of (i) a mineral acid of the group consisting of hydrochloric, sulfuric, nitric, sulfurous and hypochlorous acids, and the aluminum salts of such acids, and (ii) fluorine-containing substances of the group consisting of HF, fluosilicic acid, and alkali salts of such acids; at least a portion of said acid reactant coming from group (ii) substances in an amount sufficient to provide said make-up fluorine, and the total amount of acid reactant being sufficient that the reaction mixture reaches a stabilized pH in the range from about 4.8 to about 6.7. Thereafter the resulting cryolite material is recovered and returned to the reduction cells as needed for replenishment of the electrolyte.

The reactive alumina should be in a form which is readily attacked by the acid reactant, as for example, Bayer process alumina trihydrate, sodium aluminate, aluminum hydroxide, or the mineral Dawsonite $$(Al_2O_3 \cdot Na_2CO_3)$$

which is commonly present in alkaline cryolite materials which have been precipitated by the reaction of carbon dioxide on caustic-fluoride solutions containing an excess of alumina. The amount of reactive alumina employed must be sufficient to adjust the Na:Al molar ratio of the system to the desired final value less than 3:1, preferably a slight excess of about 2% to 10% alumina in order to achieve optimum fluorine recovery.

The acid reactants which may be employed in accordance with the invention include, for example, hydrochloric acid, sulfuric acid, sulfurous acid, hypochlorous acid  (HClO+HCl), and nitric acid, and their aluminum salts, such as aluminum chloride, aluminum sulfate, and aluminum nitrate.

It is to be noted that the use of an aluminum salt such as aluminum chloride, for example, avoids the necessity of adding reactive alumina separately, because sufficient reactive alumina can be produced in situ by addition of sodium hydroxide or the like. Thus, the terminology "in the presence of reactive alumina" is used herein in the general sense of there being provided in one way or another sufficient aluminum ions to effectuate the desired reaction to form cryolitic material comprising excess aluminum fluoride.

There may also be employed as the acid reactant, in accordance with the invention, either (a) hydrofluoric acid, or (b) HF or an alkali salt thereof, such as sodium fluoride, in admixture with a mineral acid such as hydrochloric, sulfuric, nitric, sulfurous, or hypochlorous acids, or an aluminum salt of any such acid. The fluorine-containing component of the acid reactant is used, however, in an amount sufficient to provide any additional fluorine values needed for the desired product. Any remaining portion of the total acid reactant required may be chosen from the other reactants mentioned.

There may be further employed as the acid reactant, in accordance with the invention, fluosilicic acid or the alkali salts thereof, such as, for example, sodium fluosilicate. The fluosilicic acid or alkali fluosilicate should preferably contain a minimal amount of phosphorus compounds since these tend to collect in the cryolite product with resultant detriment to reduction cell operation. Where fluosilicic acid contains excessive amounts of $P_2O_5$, it can be purified by treatment with a sodium compound to precipitate the sodium fluosilicate therefrom, which salt comes substantially uncontaminated, with the phosphoric acid remaining in solution. The sodium fluosilicate thus obtained, being a strongly acidic salt, can then be employed in lieu of fluosilicic acid.

The use of fluosilicic acid typically produces a decrease in silica content of the cryolite material to less than half the original content, e.g. from 0.46% to 0.20%. It is paradoxical that an acid containing more than 40% silica as $SiO_2$ can thus be employed to remove silica from the cryolite material, and this points up a novel and unexpected feature of the invention. Sodium fluosilicate may be employed similarly for treatment of cryolite material by digesting such material with sodium fluosilicate solution, decanting the liquor containing the silicic acid, and removing the thus beneficiated cryolite material.

It is believed that the reactive alumina (together with excess sodium present) is converted to a useful lower ratio cryolite material, e.g. chiolite $Na_5Al_3F_{14}$.

It is necessary to have the final pH of the reaction mixture within the range of about 4.8 to 6.7 in order to maintain silica of the fluosilicic acid in solution while the cryolite precipitates. It is also preferable to wash the cryolite product by repulping with water and filtering, to remove entrained mother liquor and to lower the silica content of the cryolite product to 0.2% or less. By thus controlling the pH, it is possible to utilize the fluorine from the fluosilicic acid (or the sodium and fluorine from the sodium fluosilicate) as well as excess sodium values in the initial cryolitic material, while leaving the silica in solution. The final pH appears to have a definite relation to the $NaF/AlF_3$ weight ratio, as well as being critical to the solubilizing of the silica.

The acid reactant temperatures ordinarily will be in the range of about 70° to 100° C., preferably about 85° to 90° C.

The practice of the invention will be better understood by reference to the accompanying drawing which is a flow diagram of the process of the invention as applied to the recovery of cryolitic materials from the off-gases of an alumina reduction cell and their return, after adjustment of the $NaF/AlF_3$ weight ratio to the desired value, to the reduction cell system, as well as to the following example, which is for purposes of illustration, and is not to be considered as limiting:

Example 1

Referring to the flow diagram of the drawing, as electrolysis proceeds in the alumina reduction cell containing molten cryolite of about 1.44 $NaF/AlF_3$ weight ratio, cryolite materials with an $NaF/AlF_3$ weight ratio of about 0.84 are lost by vaporization from the cell. The airborne cryolite material, admixed with suspended alumina and carbonaceous fume, is scrubbed from the cell off-gas by passing the off-gas through a scrubber through which there flows a caustic alkali liquor containing from about 0.5 to 5 grams per liter $Na_2CO_3$ equivalent. The resulting slurry is passed to a clarifier where it is separated into a solids-lean portion (overflow) which is substantially all recycled to the scrubber, and a solids-rich portion (underflow), which is pumped to a digester. The solids of the solids-rich portion comprise substantial amounts of cryolite material and alumina, together with impurities such as $Fe_2O_3$, $SiO_2$, phosphates, and compounds of vanadium, nickel and other metals. In the digester, the solids-rich portion (together with any available amounts of crushed cathode material from cells removed from operation for rebuilding, and cryolite materials recovered from spillage, and other sources of cryolite loss) are digested with caustic solution at a temperature of about 200° F. The resultant solution comprises about 25 to 30 grams per liter $Na_2CO_3$ equivalent and is relatively free of impurity elements. The solids content of the slurry from the digester, comprising principally carbon, and alpha-alumina and insoluble compounds of impurity elements, is separated from the slurry in a continuous pressure filter and discharged to waste.

The aqueous solution portion of the digester slurry, which contains substantially all fluorine and soda values initially fed to the digester and a substantial amount of dissolved alumina, and a small amount of the solids-lean portion from the clarifier, are acidified with carbon dioxide in a carbonator, whereby precipitation of the cryolite materials and dissolved alumina is effected and the free soda values are converted to $Na_2CO_3$ and $NaHCO_3$. X-ray analysis of the solids indicates that most of the precipitated alumina is present as the mineral Dawsonite $Na_2CO_3 \cdot Al_2O_3$.

The aqueous portion of the slurry produced in the carbonater is separated from the precipitated cryolite material and alumina-containing material in a vacuum filter, a portion as required being recycled to the scrubber, and the remainder treated with lime in a causticizing reactor (not shown) to effect the removal of most of the carbonate values as insoluble $CaCO_3$, and recycled to the digester.

The solids portion of the carbonator slurry recovered by the vacuum filter, consisting essentially of high-ratio cryolite material and soda and reactive alumina values, together with about 0.4 to 0.6 percent silica value on a dry basis, is measured by weighing into batches for treatment in a ratio-adjustment reactor. The batch of solids is analyzed to determine its content of F, Na, and reactive alumina, and the amount of make-up fluorine required to offset the unrecovered losses from the reduction cell is estimated. If needed, sufficient extra soda value is added, as soda ash or as aqueous solution from the vacuum filter, to bring the Na content of the batch (including any Na that may subsequently be added as $Na_2SiF_6$) to not less than the Na content needed in the final cryolite material for an $NaF/AlF_3$ ratio value of 0.84. Additional reactive alumina is added, in the form of Dawsonite, $NaAlO_2$, $Al(OH)_3$ or the like, to bring the Al content of the batch to at least as much as needed to produce 0.84 weight ratio cryolite, and preferably about 2 to 10 percent in excess of the amount needed. The resulting batch is then slurried in the ratio-adjustment reactor with sufficient water to give a solids content of about 25 to 35 percent, and heated to about 45° C.

A quantity of HF, $H_2SiF$ and/or $Na_2SiF_6$, as desired, is weighed into a batch containing the amount of F required for the necessary make-up fluorine and added as rapidly as convenient to the ratio-adjustment reactor, while stirring and heating as needed to achieve a temperature of about 70° C. with the aid of heat evolved from the reaction.

On completion of the addition of the fluorine-containing reactant the pH of the material in the reactor is is monitored and an additional amount of any of the acid reactants previously mentioned is added as needed to maintain the pH below about 6.5 and substantially within the range of about 5 to 6.5, and the contents of the reactor are heated to about 85° to 90° C. over a period of about 20 minutes or longer, depending upon the heating capacity of the reactor.

The reaction in the ratio-adjustment reactor is usually substantially complete by the time the temperature has reached 85° to 90° C., as indicated by a substantially constant pH of about 6 to 6.5. If some excess acid solution has been inadvertently added as indicated by a steady but lower pH, a small amount of the Na-containing material originally used in formulating the batch may be added to bring the pH up to 6 to 6.5, whereby the maximum recovery of F values of the batch as precipitated cryolite is achieved.

The cryolite material is then allowed to settle in the reactor, the supernatant liquor is decanted, and the settled solids are repulped with water which may preferably contain 1 to 3 percent HF. The pulped solids are then filtered to separate the wash liquor, which is returned to the process for fluorine recovery and the solids which consist of cryolite material of substantially the specified $NaF/AlF_3$ weight ratio of 0.84, and contain desirably low siliceous impurities. The resulting cryolite material is dried at a temperature not greater than about 450° C. and then returned as make-up to the alumina reduction cells as needed to maintain the desired volume of electrolyte in each cell, thus maintaining the desired $NaF/AlF_3$ weight ratio of the cell electrolyte at substantially its desired value.

What is claimed is:

1. In the operation of alumina reduction cells by electrolysis of alumina in a fused cryolite electrolyte, including the steps of collecting the reduction cell off-gases as electrolysis proceeds and scrubbing said off-gases to recover fluorine therefrom in the form of alkaline cryolite material containing excess sodium fluoride, the improvement which comprises:

(a) determining the $NaF/AlF_3$ ratio of said alkaline cryolite material containing fluorine evolved from the electrolyte of such cells in said off-gases;

(b) determining the amount of make-up fluorine needed to offset unrecovered fluorine losses, and the amounts of sodium and aluminum required for reaction with said make-up fluorine and fluorine values in said alkaline cryolite material to form beneficiated cryolite material of a lower ratio than that found in step (a);

(c) reacting said alkaline cryolite material in the presence of reactive alumina and any additional sodium compound called for in accordance with step (b), with an acid selected from the group consisting of (i) a mineral acid from the group consisting of hydrochloric, sulfuric, nitric, sulfurous and hypochlorous acids, and the aluminum salts of such acids; and (ii) fluorine-containing substances from the group consisting of HF, fluosilicic acid, and alkali salts of such acids, at least a portion of said acid reactant coming from group (ii) substances in an amount sufficient to provide said make-up fluorine, and the total amount of acid reactant being sufficient that the reaction mixture reaches a stabilized pH in the range from about 4.8 to about 6.7; and (d) recovering the resulting beneficiated cryolite material of a ratio suitable for returning the same to said cells as needed for replenishment of the electrolyte.

2. The method of claim 1 in which the reaction of step (c) is carried out at a temperature between about 70° and 100° C.

3. The method of claim 1 in which the acid reactant includes fluosilicic acid.

4. The method of claim 1 in which the acid reactant includes sodium fluosilicate.

5. The method of claim 1 in which the reaction of step (c) is carried out in the presence of an excess of about 2 to 10% reactive alumina.

6. The method of claim 1 in which said alkaline cryolite material includes fluorine and alumina values recovered in the treatment of carbonaceous reduction cell materials.

7. The method of claim 1 in which said alkaline cryolite material contains reactive alumina in the form of Dawsonite.

8. The method of claim 1 in which the reactive alumina, sodium compound and source of fluorine are proportioned to produce beneficiated cryolite material having an $NaF/AlF_3$ weight ratio of about 0.84.

References Cited
UNITED STATES PATENTS

| | | | |
|---|---|---|---|
| 2,714,053 | 7/1955 | Albert et al. | 204—67 XR |
| 2,943,914 | 7/1960 | Moser | 204—67 XR |
| 3,128,151 | 4/1964 | Zanon et al. | 204—67 XR |
| 3,248,177 | 4/1966 | Grolee | 204—67 XR |

JOHN H. MACK, Primary Examiner

D. R. VALENTINE, Assistant Examiner